(12) United States Patent
Beyer et al.

(10) Patent No.: US 7,833,012 B2
(45) Date of Patent: Nov. 16, 2010

(54) PROCESS AND APPARATUS FOR CALCINING SOLIDS OR SLUDGES

(75) Inventors: Christoph Beyer, Muenster (DE); Walter Egger, Radenthein (AT)

(73) Assignees: Polysius AG, Beckum (DE); Maerz Ofenbau AG, Zurich (CH)

( * ) Notice: Subject to any disclaimer, the term of this patent is extended or adjusted under 35 U.S.C. 154(b) by 473 days.

(21) Appl. No.: 11/934,364

(22) Filed: Nov. 2, 2007

(65) Prior Publication Data

US 2008/0118880 A1 May 22, 2008

(30) Foreign Application Priority Data

Nov. 7, 2006 (DE) .................... 10 2006 052 416

(51) Int. Cl.
    *F27B 9/02* (2006.01)
(52) U.S. Cl. .................................. 432/129; 432/99
(58) Field of Classification Search ............... 432/124, 432/125, 129, 166, 168, 192, 207, 99; 266/197
    See application file for complete search history.

(56) References Cited

U.S. PATENT DOCUMENTS

| 786,599 | A | * | 4/1905 | Repath et al. ............. 432/129 |
| 1,444,927 | A | * | 2/1923 | Leggo ..................... 432/129 |
| 1,446,863 | A | * | 2/1923 | Townley et al. ............ 432/32 |
| 1,811,920 | A | | 6/1931 | Dickson |
| 2,104,526 | A | * | 1/1938 | Raisch ..................... 110/225 |
| 2,333,111 | A | * | 11/1943 | Lykken .................... 266/140 |
| 2,376,177 | A | * | 5/1945 | Nichols, Jr. ................ 75/483 |
| 3,030,089 | A | * | 4/1962 | Johnson, Jr. ............... 432/15 |
| 3,142,480 | A | * | 7/1964 | Azbe ....................... 432/79 |
| 3,153,633 | A | * | 10/1964 | Dreusche, Jr. ............. 502/47 |
| 3,210,180 | A | * | 10/1965 | Jukkola .................... 423/148 |
| 3,285,590 | A | * | 11/1966 | Parsons .................... 432/14 |
| 3,355,158 | A | * | 11/1967 | Campbell et al. ........... 432/79 |
| 3,905,757 | A | * | 9/1975 | von Dreusche, Jr. ........ 432/18 |
| 4,318,691 | A | * | 3/1982 | Strong ..................... 432/58 |
| 4,453,474 | A | | 6/1984 | Lewis |
| 4,740,157 | A | * | 4/1988 | D'Agrosa .................. 432/14 |
| 4,747,773 | A | * | 5/1988 | Predescu et al. ............ 432/14 |
| 4,764,107 | A | * | 8/1988 | Sundermann et al. ........ 432/96 |

FOREIGN PATENT DOCUMENTS

DE          1 225 673          9/1966

\* cited by examiner

*Primary Examiner*—Gregory A Wilson
(74) *Attorney, Agent, or Firm*—Stites & Harbison PLLC; Douglas E. Jackson

(57) ABSTRACT

The invention relates to a process and an apparatus for calcining solids or sludges in a multiple-deck furnace having a firing region, which has at least one upper heated hearth and at least one lower heated hearth, and having a cooling region, which is provided with one or more unheated hearths, material to be calcined passing first into the firing region and then into the cooling region. A portion of the material to be calcined is delivered to the at least one lower heated hearth and/or to the cooling region, bypassing the at least one upper heated hearth of the firing region.

16 Claims, 1 Drawing Sheet

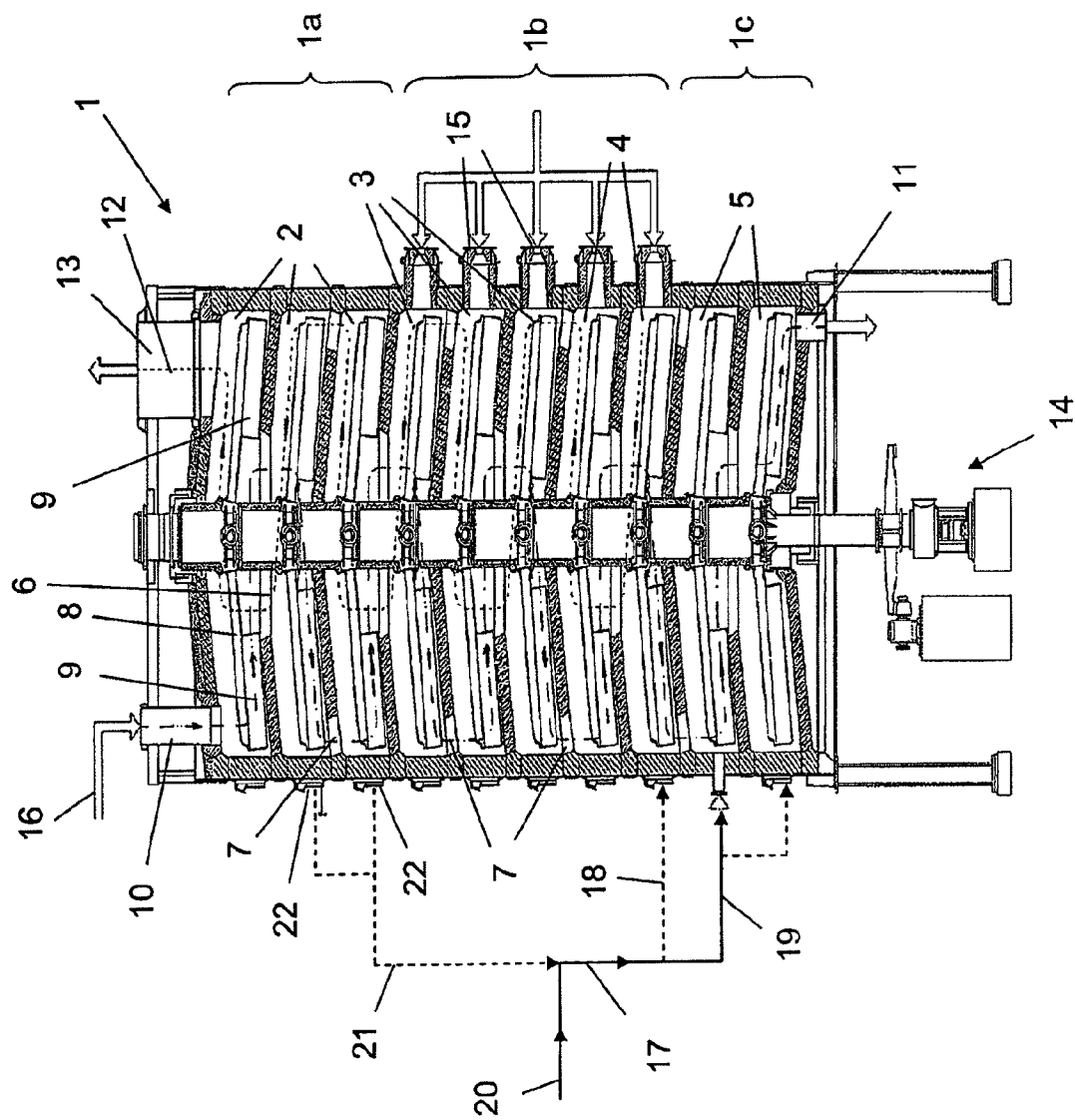

PROCESS AND APPARATUS FOR CALCINING SOLIDS OR SLUDGES

FIELD OF THE INVENTION

The invention relates to a process and an apparatus for calcining solids or sludges in a multiple-deck furnace. The furnace has a firing region, which has at least one upper heated hearth and at least one lower heated hearth. The furnace also has a cooling region, which is provided with one or more unheated hearths. Material to be calcined is passed first into the firing region and then into the cooling region.

BACKGROUND OF THE INVENTION

DE-AS-1 225 673 discloses a process for the dry reduction of iron ore in a multiple-deck furnace in the presence of a reducing gas and optionally a solid reducing agent. A dust separator for removing dust from the treated material is arranged above the multiple-deck furnace, it being possible to introduce the separated dust as recycled material into a central deck by means of conveyor devices.

BRIEF SUMMARY OF THE INVENTION

The object of the invention is to reduce the process and the apparatus for calcining solids or sludges in respect of the specific energy requirement.

According to the invention, that object is achieved by the features as discussed hereafter.

The process according to the invention for calcining solids or sludges provides for a multiple-deck furnace basically comprising a firing region, which has at least one upper heated hearth and at least one lower heated hearth, and a cooling region, which is provided with one or more unheated hearths. The material to be calcined passes first into the firing region and then into the cooling region. A portion of the material to be calcined is delivered to the at least one lower heated hearth and/or to the cooling region, bypassing the at least one upper heated hearth of the firing region.

The apparatus according to the invention for calcining solids or sludges basically comprises a multiple-deck furnace having a firing region, which has at least one upper heated hearth and at least one lower heated hearth, and having a cooling region, which is provided with one or more unheated hearths, and also means for delivering material to be calcined to the firing region. Delivery means are also provided in order to deliver a portion of the material to be calcined to the at least one lower heated hearth and/or to the cooling region, bypassing the at least one upper heated hearth of the firing region.

The invention is based on the recognition that the temperature of the material in the cooling region is more than sufficient adequately to heat and to calcine material that is delivered to one of the lower hearths of the firing region, bypassing the firing region. If the solids or sludges are magnesite, the necessary calcination temperature is approximately 600° C. Adequate intermixing of the hot calcined material and the delivered, optionally cold, fresh material in the material bed is ensured by the evacuating arms of the multiple-deck furnace and their evacuating blades. Owing to the necessary calcination enthalpy of the delivered material and the heat capacity thereof, there is a marked effect on the temperature profile in the downstream hearths. Thus, not only can the specific energy requirement be reduced but an increase in the capacity of existing units that have already been charged to capacity, especially in the firing region, is also possible. Furthermore, the material discharge temperature decreases and this leads to a lessening of the load on, and an increase in the capacity of, the downstream cooling stage, which is indispensable in a two-stage sintering process with interposed fine-milling, complying with market requirements.

The portion of the material to be calcined that is delivered to the at least one lower heated hearth and/or to the cooling region, bypassing the at least one upper heated hearth of the firing region, is to be so dimensioned that the product quality of the calcined total mass flow still complies with specifications or meets the requirements of the downstream process, especially the particle bulk density to be achieved in the sintering fire.

Further developments of the invention are the subject-matter discussed in detail hereafter.

According to one development of the invention, at least one portion of the material to be calcined is delivered to a pre-heating region upstream of the firing region. It is then also possible for the portion of the material to be calcined that has been delivered to the at least one lower heated hearth and/or to the cooling region, bypassing the at least one upper heated hearth of the firing region, to have a smaller particle size than has the material delivered to the pre-heating region.

According to a further development, the portion of the material to be calcined delivered further down is from 3 to 30%, preferably from 5 to 15% of all of the material to be calcined. Moreover, the delivered portion of the material to be calcined is delivered to a region in which the material already present has a temperature of at least 400° C., preferably at least 600° C.

It is also provided that the delivered portion of the material to be calcined is fresh material. Within the scope of the invention, it is, however, also possible for the delivered portion of the material to be calcined to be material that has been discharged from the pre-heating region.

Further advantages and developments of the invention are explained in more detail hereinafter by means of the description and the drawing.

BRIEF DESCRIPTION OF THE DRAWING

The drawing shows a schematic sectioned representation of the apparatus according to the invention for calcining solids or sludges.

DETAILED DESCRIPTION OF THE INVENTION

The apparatus shown in the drawing for calcining solids or sludges basically has a multiple-deck furnace 1 which basically comprises a pre-heating region 1a having several unheated hearths 2, a firing region 1b having several upper heated hearths 3 and several lower heated hearths 4, and also a cooling region 1c having several unheated hearths 5.

The hearths are alternately in the form of inner hearths and outer hearths. The inner hearths have internal annular openings 6 and the outer hearths have radially external transfer points 7. Each hearth is also equipped with rotating evacuating arms 8 carrying evacuating blades 9 in order to convey the material inwards, in the case of the inner hearths, to the annular opening 6 and outwards, in the case of the outer hearths, to the transfer points 7. At the annular opening 6 and the transfer points 7, the material falls into the hearth below.

The material 16 to be calcined is delivered to the uppermost hearth by way of a material feed point 10. The path of the material through the multiple-deck furnace 1 is shown by a broken line. The lowermost hearth is provided with a material discharge point 11 which is used to discharge the material.

In counter-flow to the material, a stream of gas 12 flows through the multiple-deck furnace and, in the cooling region 1c, cools the calcined material and, in the upper hearths, pre-heats the material to be calcined. This gas stream 12 is removed by way of a ventilation outlet 13 in the region of the uppermost hearth. The rotation of the evacuating arms is effected by means of a suitable drive device 14.

Whereas the hearths of the pre-heating region 1a and of the cooling region 1c are unheated hearths, the hearths 3, 4 of the firing region 1b are heated and are provided, for example, with burners 15.

In the process according to the invention for calcining solids or sludges, the majority of the material 16 to be calcined is delivered to the multiple-deck furnace by way of the material feed point 10. The material is first of all pre-heated in the hearths of the pre-heating region 1a by means of the hot gas stream 12 before it is calcined in the hearths of the firing region 1b. The material is then cooled in the hearths of the cooling region 1c.

A portion 17 of the material to be calcined is also delivered to the cooling region 1c, bypassing the upper heated hearths 3 of the firing region 1b (arrow 19). It would also be possible for the entire quantity or a portion thereof to be delivered not to the cooling region 1c but to at least one lower heated hearth 4.

According to a preferred development of the invention, the portion 17 of the material to be calcined is delivered to the cooling region, bypassing the entire firing region. The material can be fed either only to the uppermost hearth of the cooling region 1c or to several hearths of the cooling region 1c.

The delivered portion 17 of the material to be calcined is preferably fresh material 20. It is, however, also possible to discharge from one of the hearths of the pre-heating region 1a material 21 which is then delivered to one of the lower hearths 4, especially the lowermost heated hearth 4, and/or to the cooling region 1c. In order to discharge the material, suitable means 22 for discharging the material are provided.

If the delivered portion 17 of the material to be calcined is fresh material 20, it is possible for that portion 17 of the material to be calcined to have a smaller particle size than has the material 16 to be calcined delivered to the pre-heating region 1a. Basically, the quantity of the delivered portion 17 will depend on the product quality of the calcined total mass flow. In the tests on which the invention is based, a proportion of the portion 17 of the material to be calcined delivered further down in the range of from 3 to 30%, preferably in the range of from 5 to 15% of all of the material to be calcined has proved to be especially advantageous.

It should also be noted that the portion 17 of the material to be calcined delivered further down is delivered to a region in which the material present has such a high temperature that the delivered material is still calcined to a sufficient extent. Advantageously, the temperature in that region is at least 400° C., preferably 600° C.

The apparatus described above is suitable especially for calcining magnesite, dolomite or lime.

In addition to a marked increase in the capacity of a multiple-deck furnace 1 already charged to capacity in conventional operation, there is also a marked reduction in the material discharge temperature. A marked saving in energy is also noticed because the portion 17 of the material delivered further down is calcined by the heat of the material coming out of the firing region.

The invention claimed is:

1. A process for calcining solids or sludges in a multiple-deck furnace having a firing region, which has at least one upper heated hearth and at least one lower heated hearth, and having a cooling region, which is provided with one or more unheated hearths, said process comprising the step of:
    passing a main portion of a material to be calcined into the firing region and then into the cooling region, and
    delivering a bypass portion of the material to be calcined to at least one of the lower heated hearth or the cooling region, bypassing the at least one upper heated hearth of the firing region, wherein the at least one of the lower heated hearth or the cooling region has the main portion of the material already present therein at a temperature of at least 400° C.

2. A process according to claim 1, further including the step of calcining the bypass portion of the material to be calcined by the heat of the main portion of the material coming out of the firing region.

3. A process according to claim 1, wherein said delivering step delivers the bypass portion of the material to be calcined to the cooling region, bypassing the firing region.

4. A process according to claim 1, wherein said delivering step initially delivers at least one sub-portion of the bypass portion of the material to be calcined to a pre-heating region of the furnace upstream of the firing region.

5. A process according to claim 4, further including the step of providing a remainder of the bypass portion of the material to be calcined which is not initially delivered to the pre-heating region with a smaller particle size than the main portion of the material delivered to the pre-heating region.

6. A process according to claim 1, wherein the bypass portion of the material to be calcined amounts to from 3 to 30% of all the material to be calcined.

7. A process according to claim 6, wherein the bypass portion of the material to be calcined amounts to from 5 to 15% of all of the material to be calcined.

8. A process according to claim 1, wherein the at least one of the lower heated hearth or the cooling region has the material already present at a temperature of at least 600° C.

9. A process according to claim 1, wherein the bypass portion of the material to be calcined that is delivered to the cooling region is fed into one or more hearths of the cooling region.

10. A process according to claim 1, wherein said delivering step includes the step of discharging a sub-portion of the main portion of the material to be calcined from the multiple-deck furnace from at least one of any hearth of a) the pre-heating region b) the firing region or c) the cooling region.

11. A process according to claim 1, wherein the material to be calcined is at least one of magnesite, dolomite or lime.

12. A process according to claim 1, wherein the bypass portion of the material to be calcined is fresh material.

13. A process according to claim 1, further comprising the steps of:
    initially passing the main portion to a pre-heating region of the furnace upstream of the firing region; and
    providing the bypass portion of the material to be calcined with a smaller particle size than the main portion of the material delivered to the pre-heating region.

14. An apparatus for calcining solids or sludges comprising:
    a multiple-deck furnace having
        a firing region, which has at least one upper heated hearth and at least one lower heated hearth, and
        a cooling region, which is provided with one or more unheated hearths, and
        a delivery means for delivering a main portion of a material to be calcined to the firing region, and a bypass delivery means for delivering a bypass portion of the material to be calcined to at least one of the lower heated hearth or the cooling region, bypassing the at least one upper heated hearth of the firing region, wherein the at least one of the lower heated hearth or the cooling region has the main portion of the material already present therein heated to a temperature of at least 400° C.

15. An apparatus according to claim 14, further comprising a preheating and/or drying region having one or more hearths arranged upstream of the firing region.

16. An apparatus according to claim 15, further comprising means for discharging a portion of the main portion of the material to be calcined from at least one of the preheating region or the firing region.

* * * * *